United States Patent
Zillich (10) Patent No.: US 10,439,244 B2
(45) Date of Patent: Oct. 8, 2019

(54) MEMBRANE FOR A MEMBRANE-ELECTRODE UNIT OF A FUEL CELL AND PRODUCTION METHOD

(71) Applicants: VOLKSWAGEN AG, Wolfsburg (DE); AUDI AG, Ingolstadt (DE)

(72) Inventor: Christian Martin Zillich, Öhringen (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 60 days.

(21) Appl. No.: 15/748,596

(22) PCT Filed: Jul. 21, 2016

(86) PCT No.: PCT/EP2016/067431
§ 371 (c)(1),
(2) Date: Jan. 29, 2018

(87) PCT Pub. No.: WO2017/016980
PCT Pub. Date: Feb. 2, 2017

(65) Prior Publication Data
US 2019/0006691 A1    Jan. 3, 2019

(30) Foreign Application Priority Data

Jul. 30, 2015    (DE) ........................ 10 2015 214 520

(51) Int. Cl.
| | |
|---|---|
| *H01M 8/04* | (2016.01) |
| *H01M 8/1004* | (2016.01) |
| *H01M 8/0273* | (2016.01) |
| *H01M 8/2483* | (2016.01) |
| *H01M 8/1018* | (2016.01) |

(52) U.S. Cl.
CPC ....... *H01M 8/1004* (2013.01); *H01M 8/0273* (2013.01); *H01M 8/2483* (2016.02); *H01M 2008/1095* (2013.01); *Y02P 70/56* (2015.11)

(58) Field of Classification Search
CPC ....................................................... H01M 8/04
See application file for complete search history.

(56) References Cited

U.S. PATENT DOCUMENTS

2010/0075187 A1    3/2010   Muta et al.

FOREIGN PATENT DOCUMENTS

| | | |
|---|---|---|
| EP | 1 296 399 A1 | 3/2003 |
| JP | 2006-331655 * | 12/2006 |
| JP | 2006-331655 A | 12/2006 |
| JP | 2008-034251 A | 2/2008 |

\* cited by examiner

*Primary Examiner* — Jacob B Marks
(74) *Attorney, Agent, or Firm* — Seed IP Law Group LLP (57) ABSTRACT

A membrane for a membrane electrode assembly of a fuel cell has a quadrangular shape with two parallel longitudinal sides and two opposite short sides. The membrane can be produced by providing an endless membrane, wherein edges of the endless membrane form the longitudinal sides of the membrane, and processing the endless membrane by making two cuts: a first cut at a first angle to an extension direction and forming a first cut edge, and a second cut at a second angle to the extension direction and forming a second cut edge. The first cut edge and the second cut edge form the short sides of the membrane and at least one of the first and second angles are different from 90°. At least one angle enclosed by one of the short sides and an adjacent longitudinal side is different from 90°.

15 Claims, 4 Drawing Sheets

MEMBRANE FOR A MEMBRANE-ELECTRODE UNIT OF A FUEL CELL AND PRODUCTION METHOD

The invention relates to a membrane for the membrane electrode assembly of a fuel cell having a quadrangular shape with two parallel longitudinal sides and two opposite short sides, and a method for producing such.

Fuel cells use the chemical conversion of a fuel with oxygen into water in order to generate electrical energy. Fuel cells contain the so-called membrane electrode assembly (MEA), which is a combination of an ion-conducting (usually proton-conducting) membrane and an electrode (anode and cathode) on each side of the membrane. In addition, gas diffusion layers (GDL) can be arranged on both sides of the membrane electrode assembly on the sides of the electrodes facing away from the membrane. Generally, the fuel cell is formed by a plurality of MEAs arranged in the (stack), the electrical power outputs of which add up. Between the individual membrane electrode assemblies, bipolar plates (also called flux field plates) are usually arranged, which ensure a supply of the individual cells with the operating media, i.e. the reactants, and are usually also used for cooling. In addition, the bipolar plates ensure an electrically conductive contact to the membrane electrode assemblies.

During operation of the fuel cell, the fuel, especially hydrogen $H_2$ or a gas mixture containing hydrogen, is supplied to the anode over an open flux field of the bipolar plate on the anode side, where electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gastight and electrically insulated manner (in a water-bound or water-free manner). The electrons provided at the anode are guided to the cathode via an electrical line. The cathode receives oxygen or a gas mixture containing oxygen (such as air) via an open flux field of the bipolar plate on the cathode side, so that a reduction of $O_2$ to $O^{2-}$ with gain of electrons takes place. At the same time, the oxygen anions react in the cathode chamber with the protons transported via the membrane to form water.

The electrodes of a fuel cell are frequently present as a catalyst coating on the gas diffusion layers, which are then characterized as gas diffusion electrodes or as a catalyst coating on the membrane. In the latter case, it is also referred to as a catalyst coated membrane or CCM. The process of coating a membrane material with a catalytic material and thus to produce the catalyst layers in order to produce a CCM is known in various techniques. These include printing processes, spray processes, deposition processes, paint-coating processes, etc. For mass production, economical processes with high production rates are desirable.

That particular area of an MEA that is impacted with both reactant gases in the fuel cell stack for the anode and cathode and on which the fuel cell reaction takes place with the generation of electricity is characterized as the active area. The active area, however, only takes up a part of the total surface area of the MEA. The remaining areas, which may have a variable shape, are used to supply and distribute the operating media to the active area and to seal off and mechanically stabilize the MEA. These areas are referred to as distribution areas and have predominantly non-active or inactive areas. In conventional fuel cells, the active area has at least one rectangular shape. In the effort to achieve a high utilization of surface area for the active area, assemblies have been developed recently with nonrectangular active areas, for example with a regular or irregular hexagonal contour as shown in FIG. 2. For cost reasons, it is essentially desirable to only equip the active area with the catalyst layer. The selective coating of only the active area is possible with printing processes, for example with offset or screen printing. These processes, however, are comparatively slow in the case of screen printing, or require cost-intensive machinery (offset printing). Continuous coating processes, on the other hand, in which the membrane material is continuously coated with the catalytic material and the catalyst coated membrane is subsequently cut out using an assembly cut, are quicker and less labor-intensive. The disadvantage here is that, in the case of nonrectangular active areas, the coating of inactive areas of the membrane or of the membrane offcut is unavoidable. To the extent that inactive areas are adversely coated with catalytic material, these areas must be subsequently blocked, for example, by applying diffusion barrier layers. In any case, the excess coating represents a loss of catalytic material.

According to EP 1 296 399 A1, a catalytic layer is generated on a polymer electrolyte membrane through continuous spraying of a catalyst ink. The coating direction extends in this case orthogonally with respect to the subsequent main flow direction of the reactant gases. In order to achieve a variation of the catalyst properties, particularly of the catalyst concentration in the main flow direction, a spray tool is used for production, the longitudinal opening of which is subdivided into two or more compartments with which different catalyst inks can simultaneously be applied, which are superimposed on one another with graduating layer thicknesses.

The invention is based on the object to provide a membrane for a membrane electrode assembly, which has an increased power density compared to the prior art. Furthermore, a method for producing such a membrane is to be defined.

This object is solved by a membrane and a method with the features of the independent claims. Thus, a first aspect of the invention relates to a membrane for the membrane electrode assembly of a fuel cell, which has a quadrangular shape with two parallel longitudinal sides and two opposite short sides. According to the invention, at least one angle enclosed by a short side and the longitudinal sides adjacent thereto is different from 90°, in particular in the range from 40 to 80°, preferably in the range from 45 to 65°. In the present case, the enclosed angle always means the smaller angle enclosed by the short and long sides, even if this does not correspond to the internal angle of the quadrangle. Compared with known rectangular membranes, the membrane according to the invention has the advantage that, within the MEA, part of the membrane extends into the distributor region and thus the power density of the membrane electrode assembly is increased. Compared with membranes which have a prismatic, i.e. essentially hexagonal shape, it is possible with the membrane according to the invention that the production direction corresponds to the main direction of the membrane. Thus, the loss of material in the production of the membrane according to the invention is significantly reduced. In addition, the membrane according to the invention has a geometrically simpler form than known prismatic membranes and at the same time affords their advantages. The membrane of the invention is designed such that advantageously the entire membrane for the production of a membrane electrode assembly can be activated, i.e. can be coated with a catalytic material. This maximizes the usable active area and increases the power density of the future membrane electrode assembly and thus achieves optimization of the installation space size of the future fuel cell stack.

In a preferred embodiment, all internal angles of the quadrangle are different from 90°. Thus, the membrane may have the shape of a trapezoid or a parallelogram. The advantage of this embodiment is that the membrane is individually adapted to the bipolar plate such that a part of the membrane electrode assembly extends into the distributor region.

Furthermore, the opposite short sides are preferably parallel to one another. Thus, the membrane according to the invention of this embodiment has the shape of a parallelogram, wherein the respective opposite angles are equal. If the membrane has the shape of a parallelogram, that is to say a regular rectangle, the production is simplified compared to irregular geometric shapes.

A further aspect of the invention is a method for the production of a membrane according to the invention. The method according to the invention comprises the following steps in the order indicated: First, the provision of an endless membrane, wherein the edges of the continuous membrane preferably form the longitudinal sides of the membrane, as well as the making up of the continuous membrane by two straight cuts. According to the invention, the fabrication comprises a first step a), which is carried out at a first angle α to the direction of extension and results in a first cut edge, and b) a second cut, which is executed at a second angle β to the direction of extension and results in a second cut edge, wherein the first angle α and/or the second angle β are different from 90°. Preferably, the first cut edge and the second cut edge form the short sides of the future membrane, wherein the first and/or the second angle α and/or β are different from 90° according to the invention. Alternatively, the first cut edge and the second cut edge form the longitudinal sides of the future membrane.

The method according to the invention is characterized in particular by the fact that the edges of the endless membrane correspond to the later longitudinal sides of the membrane. This ensures that the direction of production of the membrane corresponds to the main direction, in particular the direction of extension, of the membrane. For carrying out the method according to the invention no masks or elaborate patterns are necessary, since with accurate alignment of the endless membrane only at least one cutting tool is required, which is aligned at a defined cutting angle α to the edge of the endless membrane. Preferably, the angle of the tool to the endless membrane is adjustable in the range of 0° to 180°. Thus, the method according to the invention represents a particularly simple and reproducible production process with maximum yield.

During production, the endless membrane is preferably moved continuously or stepwise against the at least one cutting tool. The membrane length, i.e. the distance between the cut edges, is defined by a temporal component in continuous driving, in a stepwise driving by a conveying length.

In the present case, the endless membrane is a membrane material in a band-shaped blank with two parallel longitudinal sides, which is designed in particular as an endless belt which can be stored and transported on rollers, for example. The continuous membrane may be coated, in particular catalytically coated, and may also be uncoated membrane material. In this case, the membrane material is preferably a polymer electrolyte membrane, such as Nafion.

In a preferred embodiment of the method according to the invention, it is provided that the fabrication of the continuous membrane is repeated to produce further membranes. In this case, with n-times execution of the two sections n+1 membranes are formed each time. In other words, the first and second cuts are repeated alternately. In this case, 2n−2 cuts each form the cut edges of two membranes. That is, for example, the first cut forms the first cut edge of a first membrane, and the second cut forms the second cut edge of the first membrane. At the same time, the second cut forms the first cut edge of the following second membrane. The third section in turn forms the second cut edge of the second membrane and at the same time the first cut edge of another third membrane. Thus, multiple membranes can be produced in sequential process control, with no waste of membrane material.

The angles α and β of the first and second sections are particularly preferably the same size. In this embodiment, the plurality of prefabricated membranes can be further processed after a sequential packaging process without additional intermediate steps. In addition, a cutting tool, which is always aligned at the same angle to the endless membrane is sufficient.

Further, it is preferable that the first angle α and the second angle β are different from each other. This embodiment offers the advantage that, under certain circumstances, a better adaptation to the bipolar plate can take place. This embodiment is characterized in particular by an optimized space geometry and thus lower demands on the space. In this embodiment, it is preferred that the two cuts are carried out with cutting tools which are aligned at different angles (α and β) to the endless membrane and are actuated simultaneously or sequentially. Alternatively, the two cuts are also performed at different angles α and β with only one cutting tool in that the tool first performs the first cut at an angle α to the endless membrane, then the angle of the cutting tool is adjusted to the endless membrane by the difference between α and β, and finally, the second cut is performed at an angle β to the endless membrane.

In particular, when the angle α is formed differently from the angle β, it is preferred that the first and second cut edges form the short sides of the membrane and a diaphragm developed between the second section and the first section is rotated through 180° prior to further treatment of the membrane. The axis of rotation is arranged at a center of the membrane perpendicular to its surface. At different angles of intersection α and β the membranes formed in a sequential processing in the manner described are continuous, but arranged alternately with respect to the preceding short side. This means that in the case of the first membrane a short side runs ahead, which encloses the angle α with the adjacent longitudinal sides, the short side precedes the following membrane, which encloses the angle β with the adjacent longitudinal sides, and so on. In order to ensure a uniform alignment in the following process steps, such as, for example, arranging the membrane in the bipolar plate, it is therefore advantageous to rotate every second membrane, i.e. every membrane developed between the second cut and the first cut, in such a way that the individual membranes, in particular in the longitudinal direction, are aligned parallel to each other.

To arrange the membrane according to the invention in a bipolar plate, the membrane is preferably coated with a catalyst material before or after the assembly, in particular over the entire surface. This coating is produced, in particular, in a plurality of catalyst coated membranes by continuous coating of the membrane material, wherein the outer sides of the active region of adjacent catalyst coated membranes are arranged parallel to one another on the membrane material. The coating of prefabricated membranes offers the advantage that membrane electrode assemblies can be produced which have an active region which is smaller than the membrane and, in particular, has a rectangular form. For this purpose, the membranes are arranged, for example, transversely to the main flow direction or to the production direction of the membranes one behind the other and coated such that a rectangular area is formed, the length of which is defined by an overlap of the longitudinal sides. Alternatively, the entire membrane surface is coated with catalytic material. For this purpose, it is particularly preferred that the continuous membrane is already coated before the assembly.

Basically, any known process can be used to apply the catalytic material to the membrane material. However, the invention enables the selective but expensive and slow printing processes to be dispensed with. Preferably, the application of the catalytic material takes place through spraying, spreading, or rolling. These techniques are characterized in that they can be implemented with less labor and high production rates and additionally can be integrated into the continuous roller processes. The catalytic material in this case is used, for example, in an aqueous or non-aqueous solvent as a more or less viscous paste or as a liquid suspension or solution. The solvent is removed after the application and before or after the manufacturing through active or inactive drying processes.

A further aspect of the present invention relates to a membrane electrode assembly comprising a membrane according to the invention, which is produced or can be produced according to the method according to the invention. In the membrane electrode assembly according to the invention, the membrane preferably has an active catalytic coating on both sides, in particular over the entire area. Preferably, it further comprises a protective layer arranged on one or both sides, which surrounds the CCM and particularly the operating media ports like a frame and is used for mechanical stabilization. As an option, seals can be arranged on the membrane electrode assembly. Typically, the coating direction used during production can be verified, for example, through microscopic inspections of the CCM. Furthermore, the coating direction can be retraced using the edge areas of the coating area.

In addition, the invention relates to a fuel cell stack comprising a plurality of membrane electrode assemblies alternately stacked with bipolar plates according to the invention. The fuel cell stack can particularly be used in an aircraft having an electromotor drive, in which the fuel cell stack is used to supply electricity to the electric motor and/or a traction battery.

Additional preferred embodiments of the invention arise from the remaining features stated in the dependent claims.

The various embodiments of the invention mentioned in this application may be combined advantageously with one another unless stated otherwise in individual cases.

Figure 1:
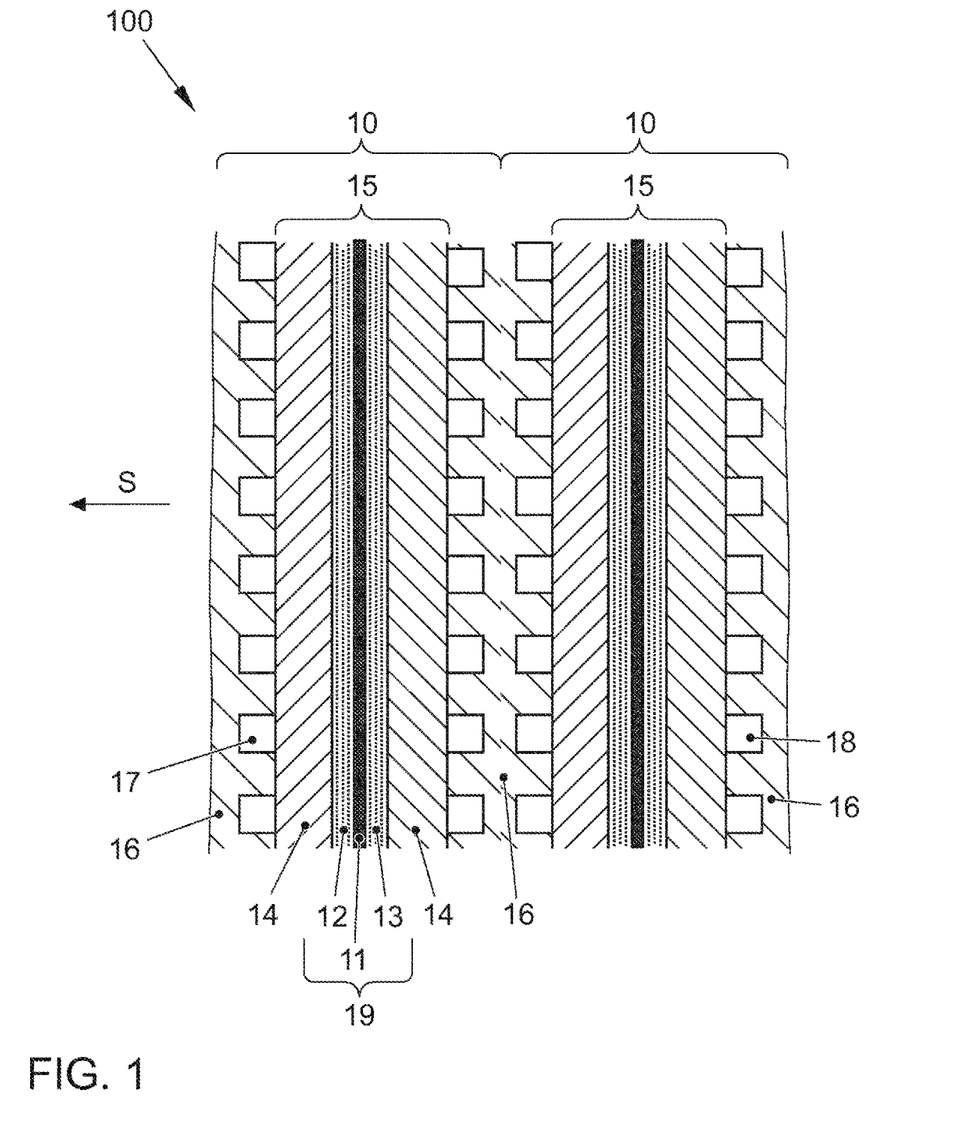
FIG. 1 a schematic cross-sectional view of a fuel cell stack.

The invention will be explained below in exemplary embodiments with reference to associated Figures. The following is shown:

FIG. 1 shows a cutout of a fuel cell stack, designated overall with 100, of which only two individual fuel cells 10 are shown here.

Each fuel cell 10 has a polymer electrolyte membrane 11, which consists of an electrolytically conductive polymer material, which is particularly capable of conducting protons. Typically, the polymer material requires a certain humidity to maintain its electrolytic conductivity. A catalyst layer adjoins both flat sides of the membrane 11, namely an anode catalyst layer 12 and a cathode catalyst layer 13. The catalyst layers, 12 and 13, comprise a catalytic material, which is typically a precious metal, particularly platinum. Typically, the catalyst layers 12, 13 further comprise a porous, electrically conductive carrier material, on which the catalytic material is finely dispersed, for example a carbon-based material. The catalyst layers 12, 13 may further comprise components, for example polymer binder materials and the like.

A gas diffusion layer (GDL) 14 adjoins each catalyst layer 12, 13. The GDL comprises a material through which liquids can flow, which is likewise electrically conductive. For example, the GDL 14 comprises a carbon-based foam or paper material. The structure made up of membrane 11, the catalyst layers 12, 13, as well as the gas diffusion layers 14 is also characterized as the membrane electrode assembly 15 in which the allocation of the gas diffusion layers 14 to the membrane electrode assembly 15 varies in the literature.

A bipolar plate 16, also characterized as the flow field plate or flux field plate, is arranged between each of two membrane electrode assemblies 15. On its anode side, the bipolar plate 16 has anode flow channels 17, by means of which an anode operating media (fuel), particularly hydrogen, is routed to the anode catalyst layer 12. Furthermore, on its cathode side, the bipolar plate 16 has cathode flow channels 18, by means of which a cathode operating gas, which is typically an oxygen-containing gas, usually air, is routed to the cathode catalyst layer 13. Typically, the bipolar plate 16 further has internal coolant channels, not shown here, through which a coolant can be routed for cooling the fuel cell stack 100. The bipolar plate 16 is produced from an electrically conductive material, for example a metal, a metal alloy, graphite, or an electrically conductive polymer material or polymer composite material. The bipolar plate 16 thus combines the functions of the operating media supply, the cooling, as well as the electrical connection of the catalytic electrodes 12, 13 to an external current circuit.

Normally plurality of such individual cells 10 is arranged in a fuel cell stack 100, whose electrical outputs combine. For electric vehicle applications, fuel cell stacks 100 typically comprise several hundred individual cells 10.

The catalyst layers, 12 and 13, may be present, on one hand, as a coating on the membrane 11. In this case, this is also considered to be a catalyst coated membrane or CCM, which is designated overall with 19 in FIG. 1. Alternatively, the catalyst layers 12 and 13 may be present as a coating of the gas diffusion layers 14 so that they are then referred to as gas diffusion electrodes. The present invention primarily relates to the case of a catalyst coated membrane 19, as well as a method for the production thereof.

Figure 2A:
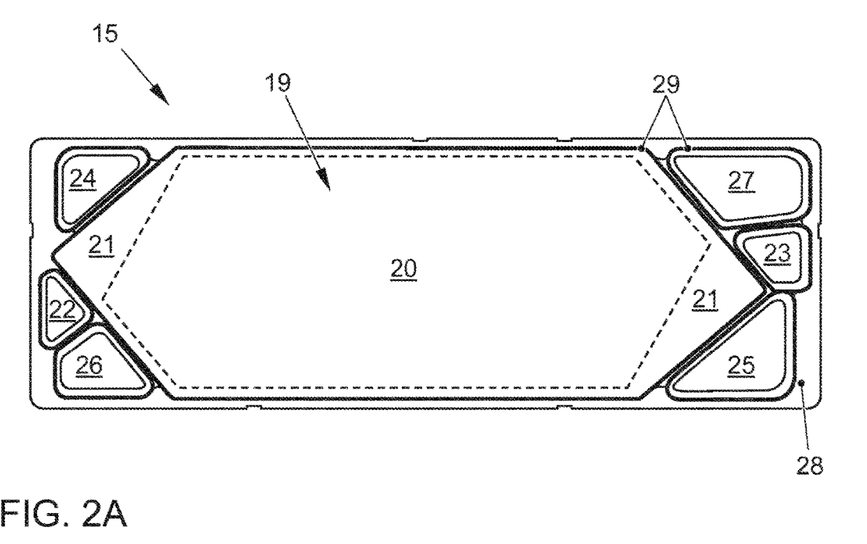
FIG. 2 a plan view of a membrane electrode assembly according to the prior art.

FIG. 2A shows a membrane electrode assembly 15 according to prior art in a plan view of one of its flat sides. The membrane electrode assembly 15 shows the catalytically coated membrane 19. In the example shown, the catalyst coated membrane 19 has a hexagonal contour. Within this hexagonal contour, an active area 20 is arranged, which is indicated by a dashed line. Outside of the active area 20, the catalyst coated membrane 19 has inactive areas 21. The active area 20 is characterized in that in the installed state of the membrane electrode assembly 15 in a fuel cell stack 100 the fuel cell reactions at the anode and cathode take place in this area and electricity is thus generated. The inactive areas 21, on the other hand, are used for other functions, for example to supply operating media to the active area 20. Ideally, the polymer electrolyte membrane 11 is coated with the catalytic coatings 12 and 13 only in the active area 20.

The membrane electrode assembly 15 comprises various passage openings, 22 to 27, which are used to supply and remove the various operating media. A first anode port 22 thus serves to supply the anode operating gas to the anodes 12 of the fuel cell stack 100 and an opposite second anode gas port 23 serves to take away the anode operating gas. Likewise, a first cathode port 24 is used to supply a cathode operating gas to the cathodes 13 of the fuel cell stack 100 and an opposing second cathode gas port 25 is used to remove the cathode operating gas. Finally, a first coolant port 26 is used to supply a coolant to the internal coolant channels of the bipolar plates 16 and an opposing second coolant port 27 is used to remove the coolant. The bipolar plates 16, which are not shown in detail, have an essentially equivalent cut to the membrane electrode assembly 15 shown, particularly corresponding ports. In this manner, in the stacked state of the membrane electrode assemblies 15 and bipolar plates 16, operating media main channels are formed, which implement the fuel cell stack 100 in its stack direction S (see FIG. 1). (These operating media main channels are not shown in FIG. 1, which only shows a section through the active area 20 of the fuel cell stack.) The anode and cathode ports 22 to 25 are connected to the corresponding anode and/or cathode channels 17, 18 of the bipolar plates 16 so as to convey fluid by means of open distribution channels of the bipolar plates 16 adjoining in the stack 100. The coolant ports 26, 27 are connected to the internal coolant channels of the bipolar plates 16. The distribution channel structures connecting the ports 22 to 27 and the anode and/or cathode channels 17, 18 of the active area 20 extend into the inactive areas 21.

For mechanical support, the membrane 11 is typically enclosed on both sides by a protective layer 28, which encloses the membrane 11 at its edge areas. Optionally, the membrane 11 can also extend over the entire area of the membrane electrode assembly 15 and be laminated on its edge areas with support layers 28. Furthermore, seals 29 can be seen in FIG. 2A which surround the operating medium passage openings 22 to 27 and the catalyst coated membrane 19 in order to seal them to the outside. Optionally, the seals 29 can be arranged on the bipolar plates 16 instead of on the membrane electrode assembly 15 or may be arranged on both.

As previously explained, the fuel cell reaction takes place only in the active area 20. Thus, the target is to apply the catalyst layers 12 and 13 only in this area to the extent possible because the catalytic material represents the most expensive individual component of the fuel cell stack by far. On the other hand, the aim is to make the active area 20 as large as possible and the inactive areas 21 as small as possible in order to achieve the highest possible energy yield or to minimize the required installation space and the weight of the fuel cell. The contours of the active area 20 accord-ingly resulting from said targeting may deviate from the conventional rectangular contour (as shown in FIG. 2A) and have an irregular contour.

The economical and time-saving mass production of catalyst coated membranes 19 with a nonrectangular active area has only been achieved in an unsatisfactory manner until now. For example, the production through selective coating processes can take place in which the catalytic material is exclusively applied to the active area 20 of a membrane material, for example through selective print processes, such as print screening or offset screening. These processes, however, are characterized by a slow production speed (print screening) or by cost-intensive machines (offset printing). On the other hand, continuous coating processes in which the catalytic material is applied with the creation of a constant coating width on the membrane material are quicker and more cost-efficient.

Figure 2B:
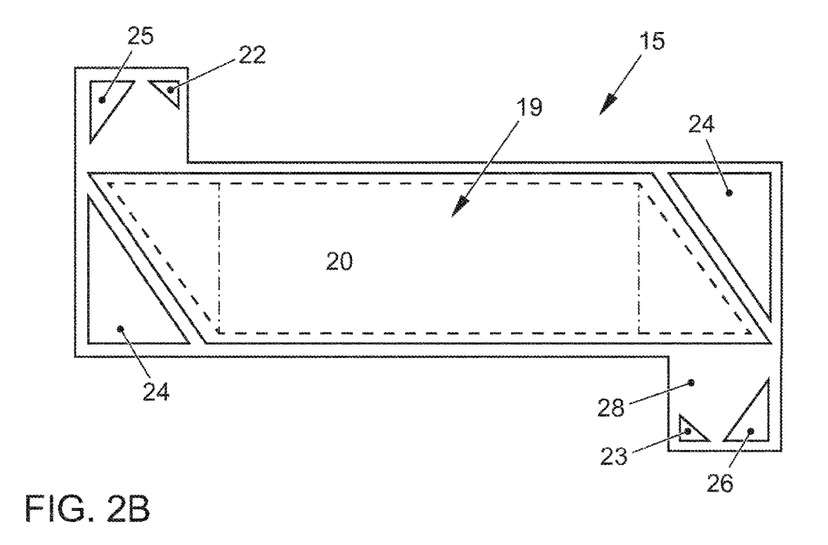

FIG. 2B shows a membrane electrode assembly according to the invention. The basic structure of the membrane electrode assembly according to the invention essentially corresponds to that shown in FIG. 2A. The difference is in the shape of the membrane 30 and the electrodes. In the present case, the membrane has a quadrangular shape with two parallel longitudinal sides. The short sides are at an angle to the long sides, which is different from 90°. In FIG. 2B, the membrane has the shape of a parallelogram.

The main operating agent ports are disposed in the distributor region, while the cathode main port is in alignment with the extension of the active area. The coolant main port and the anode main port are laterally disposed with respect to the diaphragm in the manifold region.

Figure 3:
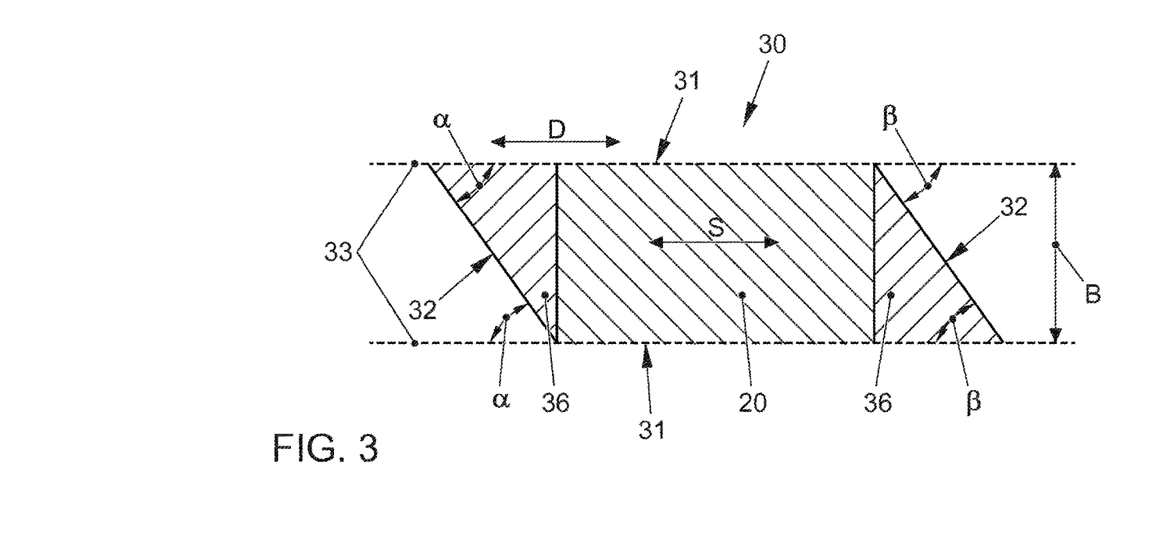
FIG. 3 a schematic diagram of a membrane according to the invention in a first embodiment, FIG. 4 a schematic sectional sketch of the implementation of the method according to the invention for producing the membrane according to the invention in the first embodiment, FIG. 5 a schematic diagram of a membrane according to the invention in a second embodiment, and FIG. 6 a schematic sectional sketch of the implementation of the inventive method for producing the membrane according to the invention in the second embodiment.
Figure 5:
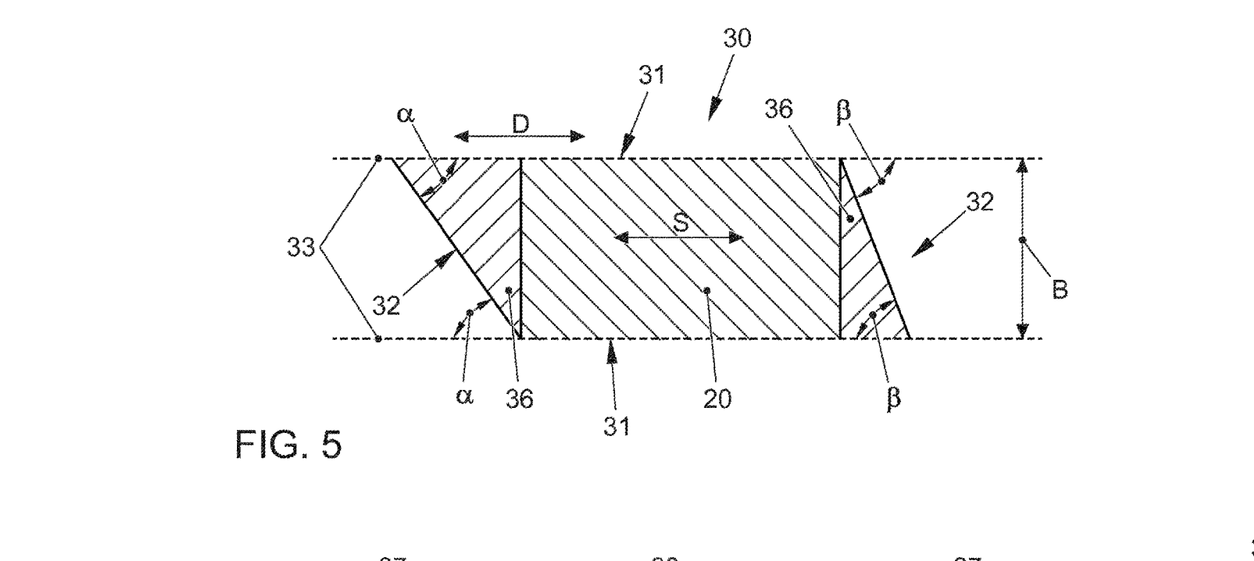

FIGS. 3 and 5 each show a schematic diagram of the membrane 30 according to the invention in a first and second embodiment. Shown in each case is a membrane 30 in quadrangular shape. The longitudinal sides 31 of the membrane 30 are arranged parallel to each other. The distance between the longitudinal sides 31 to each other defines the width B of the membrane 30. The membrane 30 is characterized in that the direction of extension S of the membrane 30 corresponds to the direction of production D. That is, the longitudinal sides 31 are at least parallel to a direction of extension of the starting material, such as an endless membrane. Preferably, the width B of the membrane 30 corresponds to the width of the starting material so that the longitudinal sides 31 coincide with the edges 33 of the starting material, or respectively of the endless membrane.

In addition to the two longitudinal sides 31, the structure of the membrane is defined by two short sides 32. The short sides are arranged at the two opposite ends of a longitudinal side 31 and connect the ends of the opposite longitudinal sides 31 with each other. Each longitudinal side 31 encloses with the two short sides 32 an angle $\alpha$, $\beta$ respectively, wherein in the present case always the smaller angle is meant, which does not necessarily correspond to an internal angle of the quadrilateral.

According to the invention, at least one of the angles $\alpha$ or $\beta$ is different from 90°. The angles $\alpha$ and $\beta$ can be the same (FIG. 3) or different from one another (FIG. 5).

The membrane 30 may be divided into three regions, an active region 20 and a distributor region 36. These regions 20, 36 are formed in a functionalization of the membrane 30 by catalytic coating or partial inactivation of a catalytic coating. In this case, the active region 20 always has an active catalytic coating. The distributor region 36 of the membrane 30 can have an activatable region, which in the membrane 30 according to the invention corresponds to the entire distributor region 36, since it can likewise be fully activated in the inventive form of membrane 30, i.e. may have an active catalytic coating.

When using the membrane 30 according to the invention in a fuel cell, the membrane 30 is arranged between two bipolar plates such that the active region 20 is arranged in the active region of the fuel cell, in which flow channels of a fuel and an oxidizing agent are equally present and preferably parallel to one another. In contrast, the distributor region 36 is arranged in the distributor region of the fuel cell in which the flow channels are supplied to the active region. Depending on the configuration of the bipolar plates used, the flow channels of oxidizing agent and fuel may also overlap in the distributor area of the bipolar plates. This region ideally corresponds to the distributor region 36 of the membrane 30 according to the invention. In this embodiment, the distributor region 36 is preferably activated, i.e. the membrane 30 has an active catalytic coating over its entire area.

Figure 4:
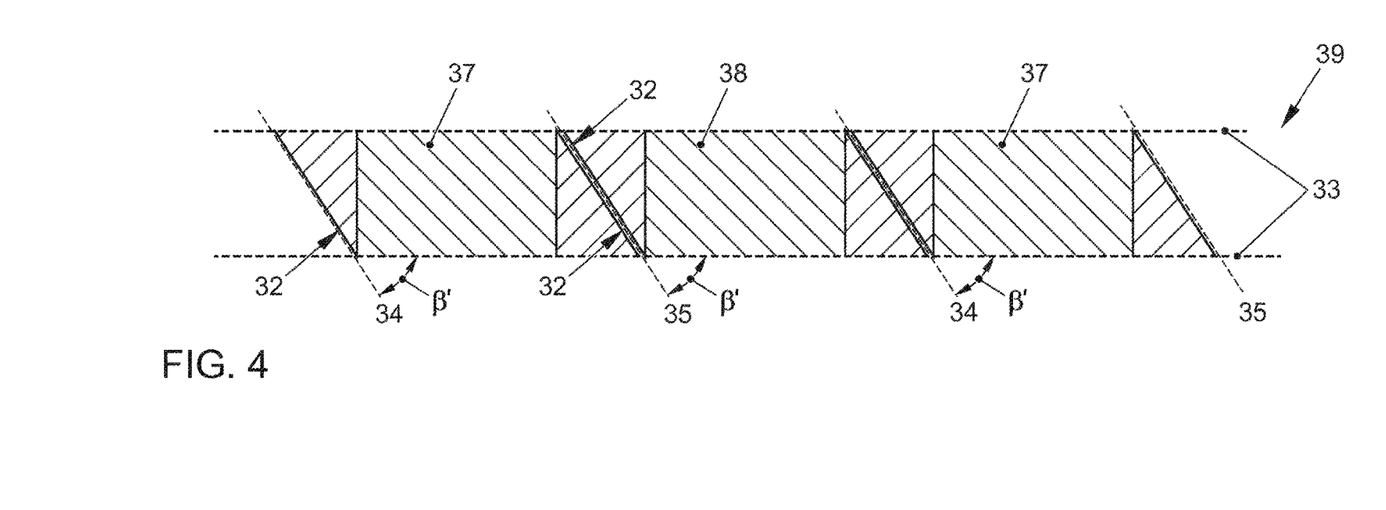
Figure 6:
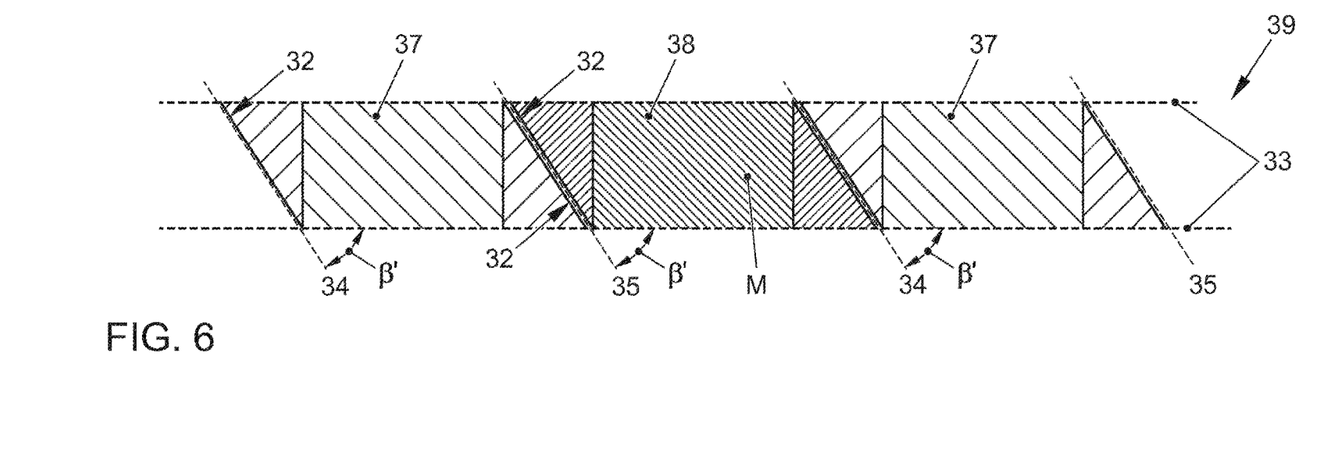

FIGS. 4 and 6 show a schematic sectional sketch during the production of the membranes 30 according to the invention according to the first (FIG. 4) or second (FIG. 6) embodiment.

Shown is an endless membrane 39, from which with the method according to the invention a plurality of the membranes 30 according to the invention are formed by the repetition of two sections 34, 35. In order to produce a membrane 30 according to the invention, the endless membrane 39 is cut with two cuts, a first cut and a second cut. The cuts can be made sequentially or simultaneously with the same or different tools. The two cuts can be repeated arbitrarily by an n-fold, depending on a length of the endless membrane 39, whereby n+1 membranes 30 are formed.

The resulting cut edges of the endless membrane 39 each form the short sides of the membrane 30. In this case, with the exception of the first and the last cut within a method, two short sides of two membranes 30 are generated by each cut. Between each two resulting cut edges 34 and 35, one m-th membrane is formed and between two cut edges 35 and 34 one m+1-th membrane 30 is formed.

The resulting first cut edge 34 has an angle $\alpha'$ to the edges 33 of the endless membrane which corresponds to the angle $\alpha$ of the membrane 30 according to the invention. Accordingly, the resulting second cut edge 35 to the edges 33 of the endless membrane has an angle $\beta'$, which corresponds to the angle $\beta$. At least one angle $\alpha'$ and/or $\beta'$ is different according to the invention from 90°.

The two angles $\alpha'$ and $\beta'$ may be the same as shown in FIG. 4 or different from each other as shown in FIG. 6. If the angles $\alpha'$ and $\beta'$ are the same, then all the generated membranes 30 are aligned identically. If the angles $\alpha'$ and $\beta'$ are different, as in the embodiment of FIG. 6, every second, i.e. in each case one m+1-th membrane 38, is oriented in opposite directions to the leading and trailing membrane 37. That is, while in the m-th membrane 37, the short side precedes the angle $\alpha$, the m+1-th membrane 38 is oriented such that the short side precedes the angle $\beta$. In order to simplify further process steps, it is proposed in such cases to rotate the m+1-th membrane 38 with respect to a rotation axis through the center M of the membrane 38 by 180°.

Accordingly, the method according to the invention is suitable for producing membranes 30 without waste from an endless membrane 39 in a sequential manner, regardless of whether the angles $\alpha$ and $\beta$ enclosed by the short sides 32 and longitudinal sides 31 differ from one another.

LIST OF REFERENCE SYMBOLS

100 Fuel cell stack
10 Fuel cell (single cell)
11 Polymer electrolyte membrane
12 Anode catalyst layer/anode
13 Cathode catalyst layer/cathode
14 Gas diffusion layer
15 Membrane electrode assembly
15' Membrane electrode assembly according to prior art
16 Bipolar plate
17 Anode flow channels
18 Cathode flow channels
19 Catalyst coated membrane
20 Active area
21 Inactive area
22 First anode port
23 Second anode port
24 First cathode port
25 Second cathode port
26 First coolant port
27 Second coolant port
28 Support layer
29 Seal
30 Membrane
31 Longitudinal side
32 Short side
33 Edges of the endless membrane
34 First cut edge/first cut
35 Second cut edge/second cut
36 Distributor region
37 m-th membrane
38 m+1-th membrane
39 Endless membrane
$\alpha$ First angle
$\beta$ Second angle
B Coating width
D Production direction of the membrane electrode assembly
S Main direction of the membrane electrode assembly
M Center of the membrane electrode assembly

The invention claimed is:

1. A membrane electrode assembly of a fuel cell, comprising:
   a membrane having a shape including a quadrilateral with two parallel longitudinal sides and two opposite short sides, wherein at least one angle enclosed by a short side and by a longitudinal side adjacent thereto is different from 90°.

2. The membrane electrode assembly according to claim 1 wherein all internal angles of the quadrilateral are different from 90°.

3. The membrane electrode assembly according to claim 1 wherein the opposite short sides are parallel to one another.

4. A method for producing a membrane for a membrane electrode assembly, comprising, in order:
   providing an endless membrane, and
   processing the endless membrane by:
      a first cut executed at a first angle to an extension direction of the endless membrane to form a first cut edge, and
      a second cut executed at a second angle to the extension direction to form a second cut edge,
   wherein the first angle or the second angle is different from 90°.

5. The method according to claim 4 wherein the processing of the endless membrane by a first cut and a second cut is repeated, wherein with n-fold execution of the first and second cuts, n−1 membranes are formed.

6. The method according to claim 4 wherein the first angle and the second angle are different from each other.

7. The method according to claim 6 wherein the first and second cut edges form the short sides of the membrane and a membrane formed between the second cut and the first cut is rotated by 180° before further processing, wherein the axis of rotation is arranged in a membrane plane perpendicular to the surface of the membrane.

8. The method according to claim 4 wherein the membrane is coated with a catalyst material.

9. The membrane electrode assembly according to claim 1 wherein the membrane has an active catalytic coating over its entire area.

10. The membrane electrode assembly according to claim 1 wherein the at least one angle is between 40° and 80°.

11. The membrane electrode assembly according to claim 1 wherein the at least one angle is between 45° and 65°.

12. The membrane electrode assembly according to claim 1 wherein the shape is a trapezoid.

13. The membrane electrode assembly according to claim 1 wherein the shape is a parallelogram.

14. The membrane electrode assembly according to claim 1 wherein all internal angles of the quadrilateral are the same as one another.

15. The membrane electrode assembly according to claim 1 wherein all internal angles of the quadrilateral are not the same as one another.

* * * * *